United States Patent Office 3,558,722
Patented Jan. 26, 1971

3,558,722
PROCESS FOR THE PREPARATION OF
α,ω-DICHLOROPOLYALKYLENE OXIDES
Hidehiko Kobayashi and Kiichiro Sasaguri, Tokyo, Yoshihisa Fujimoto, Fukuoka, Saitama-ken, and Jyoji Ibata, Musashino-shi, Japan, assignors to Asahi Kasei Kogyo Kabushiki Kaisha, Osaka, Japan, a corporation of Japan
No Drawing. Continuation-in-part of application Ser. No. 505,416, Oct. 27, 1965. This application Aug. 3, 1967, Ser. No. 658,025
Claims priority, application Japan, Oct. 29, 1964, 39/61,068; Feb. 27, 1965, 40/10,940; Apr. 2, 1965, 40/18,921; June 2, 1965, 40/32,164
Int. Cl. C07c 41/00, 41/02
U.S. Cl. 260—615 20 Claims

ABSTRACT OF THE DISCLOSURE

A process for the production of high purity α,ω-dichloro-polyalkylene oxides having an average molecular weight of from 508 to 5770 from tetrahydrofuran or a mixture thereof with one other cyclic ether. Said process comprises polymerizing said cyclic ether or ethers with a binary catalyst consisting of thionyl chloride and a specific Lewis acid, such as antimony pentachloride, stannic chloride, such as antimony pentachloride, stannic chloride, etc., then removing or deactivating said Lewis acid component and thereafter heat-treating the polymerization product in the presence of thionyl chloride.

This application is a continuation-in-part of Applicants' U.S. application Ser. No. 505,416 filed Oct. 27, 1965 and now abandoned.

This invention relates to a process for the preparation of pure α,ω-dichloro-polyalkylene oxides. More particularly, it relates to a process for the preparation of α,ω-dichloro-polyalkylene oxdies which comprises polymerizing tetrahydrofuran or a mixture of tetrahydrofuran and one other cyclic ether in the presence of a binary catalyst consisting of thionyl chloride and a compound selected from specific Lewis acids and, after completion of said polymerization, either removing said Lewis acid or adding a compound which destroys the catalytic activity of said Lewis acid, and then heat-treating the polymerization liquid in the presence of thionyl chloride.

The principal object and advantage of the present invention is to obtain easily a high purity α,ω-dichloro-polyalkylene oxide in good yield as a polymer having a molecular weight the value of which is easily controlled as desired.

Said high purity α,-dichloro-polyalkylene oxides can be aminated by heating them together with ammonia to α,ω-diamino-polyalkylene oxides which can be used to produce a tough epoxy resin. Further, when said α,ω-diamino-polyalkylene oxides are subjected to polymerization in admixture with a dicarboxylic acid, such as adipic acid, sebacic acid, terephthalic acid or the like and a diamino compound, such as hexamethylene diamine, piperazine, bis (p-amino-cyclohexyl) methane or the like, various elastomers can be obtained, from which elastic fibers, synthetic leathers and other useful shaped articles can be produced.

Hitherto, with respect to polymerization of cyclic ethers, many catalyst systems are known. However, only few catalyst systems can give high molecular weight polyethers under such conditions that the molecular weight can be easily controlled. Any process which directly prepares polyethers, to both chain ends of which halogen atoms are bonded, has not been known. For instance, a catalyst system which gives relatively higher molecular weight polymers among the catalysts hitherto known with respect to polymerization of tetrahydrofuran is phosphorous pentafluoride-tetrahydrofuran. However, said catalyst can not attain the objectives of the present invention. Further, a process for the polymerization using antimony pentachloride has been known. In said process, however, not only is it difficult to control the molecular weight of the produced polymer, but it is also impossible to obtain, in high purity, polyethers, to both chain ends of which halogen atoms are bonded regularly. Accordingly, this known process also can not attain the objectives of the present invention. The inventors have conducted extensive research on polymerization catalysts for various cyclic ethers including epoxy compounds. As a result, the inventors have found that a binary catalyst consisting of antimony pentachloride and thionyl chloride can produce high molecular weight polyethers in good yield compared with the above cited catalysts and other known catalyst systems, and the molecular weight of the polymer can be controlled very easily by controlling the polymerization conditions, while preparation of polyethers which contain halogen atoms directly bonded to both ends of the molecular chain can be carried out in high purity.

The mechanism of polymerization according to the above-described binary catalyst consisting of antimony pentachloride and thionyl chloride is not completely clear. When a five-member cyclic ether or a mixture of five-member cyclic ether and four-member cyclic ether is polymerized using the above catalyst systems, the polymerization reaction proceeds in colorless state and a polymer having a desired high molecular weight can be obtained in high yield. This reaction is essentially different from the polymerization reactions using antimony pentachloride as a single catalyst or using a two-component catalyst consisting of thionyl chloride and ferric chloride or aluminum chloride, in which reactions, the polymerization reactions proceed in purple-and-black colored state. Additionally, the catalyst system according to the instant invention has the excellent effect that polyethers having a desired molecular weigh can be obtained under conditions in which undesired side reactions are completely suppressed.

In order to obtain the polyether having a desired molecular weight in good yield, it is necessary to choose corresponding suitable conditions. For instance, in order to obtain a polymer having a relatively higher molecular weight, it is suitable to employ antimony pentachloride in an amount of 0.01–1.0 part by weight and thionyl chloride in an amount of 0.1–10 parts by weight per 100 parts by weight of cyclic ether. In cases in which a specially high molecular weight is not required but a polyether having an intermediate molecular weight is desired, the catalyst amount and polymerization temperature may be varied broadly corresponding to the desired molecular weight. For instance, it is possible to increase the amount of thionyl chloride up to 100 parts by weight per 100 parts by weight of cyclic ether. The range of polymerization temperature is −10°–70° C., preferably 0°–40° C. The polymerization time depends on the catalyst amount and the polymerization temperature to be used. Usually, the polymerization time is about 2–30 hours and should be determined corresponding to the desired molecular weight.

In cases in which the cyclic ethers to be polymerized contain a three-member cyclic ether such as ethylene oxide, the two-component catalyst consisting of antimony pentachloride and thionyl chloride is as excellent a catalyst as in the above-mentioned cases. Besides the above two component catalysts, for monomer systems containing a three-member cyclic ether, a two-component catalyst consisting of stannic chloride and thionyl chloride, or a two-component catalyst consisting of thionyl chloride and boron trifluoride or a complex thereof with a compound which does not react to produce unfavorable end groups also can be used as the polymerization catalyst. A two-component catalyst consisting of ferric chloride and thionyl chloride or phosgene is not a good catalyst system, because its polymerization activity is low and it causes coloring.

In the cases of polymerizing a liquid mixture of cyclic ethers including three-member cyclic ethers using the above catalyst systems, it is a feature that the molecular weight of the produced polymer can be easily controlled by changing the amount of thionyl chloride. The catalyst amount, polymerization temperature and polymerization time to be employed may be chosen as desired, in a way similar to that mentioned above.

In carrying out the polymerization reaction using the above polymerization catalyst, solvents or dispersion mediums may be used. In these cases, they should be substances inert to the catalysts used, such as carbon tetrachloride and ethylene tetrachloride. From the point of industrial economy, it is usually advantageous to employ a polymerization process according to a continuous bulk polymerization method.

From the polyethers prepared according to the above-mentioned process, by reactivating the remaining catalyst with a base such as pyridine and further heat-treating, polyethers having halogen atoms at both chain ends can be prepared in high purity.

As for the cyclic ethers to be used as the starting material for said polyethers, tetrahydrofuran is preferable. Mixtures of tetrahydrofuran and at least one compound represented by the following general formula, particularly epoxy compounds, oxacyclobutane and its derivatives and oxacyclopentane and its derivatives can be used:

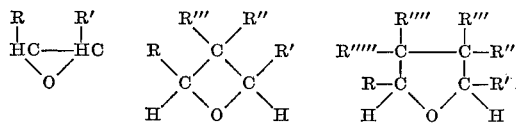

wherein R, R', R'', R''', R'''' and R''''' are hydrocarbon radicals, halogen atoms, halogenated hydrocarbon radicals and these radicals containing etheric oxygen and further groups inert to the catalysts such as hydrogen atom. More particularly, these radicals may be aliphatic cycloaliphatic or aromatic or radicals containing both aliphatic and aromatic groups. These radicals may contain halogen, preferably chlorine atom, alkoxy group and allyloxy group in addition to carbon atoms and hydrogen atoms. The aliphatic part of these radicals may contain carbon-carbon unsaturated bond. Further, an R radical may combine with another R radical to form a ring structure. The expression "inert to the catalyst" in the above description means that the radicals never react with the catalyst, or that if they react, the reaction rate is much lower than the reaction rate of the catalyst with the cyclic ether, so that the polymerization reaction is not influenced. Radicals active to the catalysts are those containing functional group having active hydrogen such as an amino group, a hydroxyl group or a carboxyl group. In cases in which an oxygen atom or a halogen atom is contained, radicals in which the atom is not separated from the other oxygen atom by at least two carbon atoms are also active to the catalyst.

Examples of the cyclic ethers which can be used in the present invention are as follows:

ethylene oxide,
1,2-propylene oxide,
1,2-butylene oxide,
1,3-butylene oxide,
2,3-butylene oxide,
2-methyl-1,3-propylene oxide,
1,2-octylene oxide,
1,2-cyclohexylene oxide,
3-chloro-1,2-propylene oxide,
2-phenyl-1,2-ethylene oxide,
3-(o-chlorophenyl)-1,2-propylene oxide,
2,2-bischloromethyl-1,3-propylene oxide,
2-(p-tolyl)-1,3-propylene oxide,
1,4-epoxycyclohexane,
3-methoxy-1,2-propylene oxide,
4-(3-methoxyphenyl)-1,2-butylene oxide,
3-phenoxy-1,2-propylene oxide,
2-methyl-2-methoxymethyl-1,3-propylene oxide,
2-vinyl-1,2-ethylene oxide,
1-allyl-1,2-ethylene oxide,
1-allyl-1,2-propylene oxide,
2-ethyl-2-allyl-1,3-propylene oxide,
1-allyloxymethyl-1,2-ethylene oxide,
2-(4-allylphenyl)1,2-ethylene oxide and the like.

These cyclic ethers can be used singly or as a mixture thereof. Cyclic ethers which are preferably used are compounds which contain few or no radicals other than hydrogen and the functional groups which are desired to be bonded to both end carbon atoms upon the formation of the polymer. Specifically, they are the compounds in which R and R' are H in the above general formula.

In order to obtain $\alpha,\omega$-dichloro-polyalkylene oxide excellent in purity in accordance with the present invention, it is necessary to pay careful attention. For instance, when a liquid mixture of cyclic ether monomers is polymerized, it is preferable that the Lewis acid component of the two-component catalyst be previously mixed and diluted with thionyl chloride and then they are added avoiding local heating by thoroughly stirring the liquid mixture of monomers at a temperature lower than 30° C.

The polymerization temperature is limited in various aspects on the physical properties of the produced polymer, and it depends on the kind and amount of the catalyst to be used in the polymerization. For instance, when antimony pentachloride is used in an amount of 0.2%, an elevation of the polymerization temperature up to about 45° C. causes a coloring side reaction. As the polymerization temperature is elevated, the coloring reaction becomes greater and greater, that is, a yellow or light-brown color at 50° C., a brown color at 60° C. and a dark-brown color at 70° C. If the amount of antimony pentachloride to be used is decreased, the degree of coloring also decreases. For example, when the amount is 0.02%, coloring is not observed even at 50° C., but there is produced the disadvantage that a long period of polymerization reaction is required in order to obtain the polymer in desired conversion yield, because of a lowering of the polymerization reaction rate. Furthermore, though there are some variations depending on the amount of catalyst, there occurs a termination of the polymerization propagation reaction due to dehydrogenation ionic reaction in the course of polymerization, whereby terminal double bonds are produced. Thus, high purity polyether having halogen atoms at both ends of the chain can not be obtained. Another disadvantage accompanying elevation of polymerization temperature is the formation of a branched structure.

The termination (completion) of the polymerization reaction is effected by adding a compound having the function of terminating the catalytic activity of the Lewis acid, for example, ammonia, water, caustic soda, caustic potassium, organic amines, amides and other deactivating compounds of the catalyst. Especially preferable compounds are alkaline substances which neither combine nor react with thionyl chloride and combine or react only with the Lewis acid to eliminate the catalytic activity thereof. These compounds have no active hydrogen atom to give undesired reactions with thionyl chloride and show an alkaline property to the Lewis acid used as catalyst component; for example, pyridine and its derivatives such as picoline and quinoline. The amount to be used is preferably equimolar to or in small excess of the Lewis acid component of the catalyst.

Alternatively, there may be adopted a method of terminating polymerization reaction in which the Lewis acid of the catalyst is adsorbed by an adsorbent and removed from the system. For instance, the polymerization liquid after a determined period of polymerization is treated with dried active carbon to adsorb the Lewis acid of the catalyst on the active carbon, and the Lewis acid is removed together with the active carbon from the system.

Thus, as before mentioned, either the Lewis acid used as catalyst is removed or the effect of the Lewis acid cancelled by an alkaline substance as mentioned above or further the produced salt is removed. Then the polymerization liquid is heated in the presence of thionyl chloride to obtain $\alpha,\omega$-dichloro-polyalkylene oxide. When a mixture of monomers including a three-member cyclic ether is subjected to the polymerization reaction, most of the thionyl chloride can be consumed in the course of polymerization and fresh thionyl chloride must be added. The amount of fresh thionyl chloride to be added depends on the extent of proceeding of polymerization reaction, etc. When the polymerization reaction is carried out sufficiently, it is preferable to add fresh thionyl chloride in an amount of from about 50% to equal amount based on the amount of the thionyl chloride added initially as catalyst. When cyclic ethers not including a three-member cyclic ether are subjected to polymerization, it is usually not necessary to add fresh thionyl chloride. Usually, the reaction is conducted under such conditions that at least such amount of thionyl chloride that is consumed during the decomposition reaction is present in the system. The heat treating temperature is usually from 60° C. to 100° C. The heating time required depends on the heating temperature; 10–50 hours and preferably 15–25 hours at 60° C. and 1–25 hours and preferably 2–5 hours at 80° C. When the reaction temperature is elevated to 100° C., the reaction time becomes shorter, that is, 30 minutes–10 hours and preferably 1–5 hours. Of course, longer heating times than the above ranges may be adopted, but heating after the completion of the reaction has no significance.

The following examples merely illustrate the present invention, and do not restrict the same.

EXAMPLE 1

A 200 cc. three neck tapered joint glass flask was equipped with a tapered joint glass thermometer, a tapered joint glass plug and a tapered joint glass air cooling tube at the top of which a volleyball tube was mounted. The volleyball tube was filled with nitrogen gas and was stopped by a cock. Inside the three neck flask, were contained rotors of a magnetic stirrer. 85 grams of purified tetrahydrofuran were introduced into the three neck flask and the cock of the volleyball tube was opened to blow nitrogen gas into the three neck flask. After purging with nitrogen, the three neck flask was plugged tightly and cooled to —5° C. in a dry ice-methanol bath. Then the cock of the tube was closed and a mixture of thionyl chloride (27 g.) and antimony pentachloride (0.1 g.), which had been prepared at room temperature, was added. Further 15 g. of ethylene oxide obtained from a bomb were added. Then the cock of the tube was opened. After purging with nitrogen, the three neck flask was plugged tightly and was transferred to a water bath. The temperature was elevated to 20° C. and the flask was maintained at the same temperature for 2 hours while stirring with the magnetic stirrer to effect polymerization, after which the polymerization was stopped by adding 0.1 cc. of pyridine. Subsequently, 27 g. of thionyl chloride were added. A reflux condenser was inserted between said air cooling tube and the flask. After purging with nitrogen, the flask was heated to 75° C. on the water bath and was maintained at the same temperature for 6 hours, after which at the same temperature, about 0.2 g. of active carbon was added and then a small amount of sodium bicarbonate was added to decompose excess thionyl chloride. Then the flask was cooled to room temperature. After filtration, the filtrate was dried and 62 g. of $\alpha,\omega$-dichloro-polyalkylene oxide were obtained. This polymer contained chlorine in an amount of 3.54% and had an average molecular weight of 2003.

60 g. of the $\alpha,\omega$-dichloro-polyalkylene oxide thus obtained and 100 g. of liquid ammonia were placed in a 500 cc. autoclave provided with a stirrer and maintained at 100° C. for 12 hours in a sealed state while being stirred, after which the autoclave was cooled to about room temperature. The ammonia was then driven off, and the contents of the autoclave were thereafter withdrawn and dissolved in ether. The insoluble matter was filtered off, and about 2 g. of soda lime was added to the filtrate. The resulting mixture was stirred overnight and then filtered. The resulting filtrate was dried to obtain 57 g. of an $\alpha,\omega$-diamino-polyalkylene oxide. Acid titration thereof showed that said product contained a primary amine in an amount of 0.975 meq./g. and a secondary amine in an amount of 0.029 meq./g. and has an average molecular weight of 2050.

7.52 g. of said diamine, 0.540 g. of adipic acid, 1.84 g. of hexamethylene diamine adipate and 8 cc. of meta-cresol as a solvent were placed in a polymerization ampoule which was then purged with nitrogen and thereafter sealed under reduced pressure. The ampoule was heated at 230° C. for 3 hours, cooled and then opened. The ampoule was further heated in an oil bath at 250° C. for 3 hours while supplying nitrogen through a capillary into the ampoule to distil off the meta-cresol, after which the temperature of the oil bath was raised to 260° C. and the ampoule was kept at that temperature for 1 hour. The pressure of the ampoule was then reduced to about 0.1 mm. Hg, at which pressure the ampoule was heated at 260° C. for 2 hours. The thus obtained polyamide had a reduced viscosity of 2.2 as measured in meta-cresol (0.2 g./100 cc.) at 35° C. This polymer was melt-spun by extruding it at 238° C. from a one hole nozzle having a hole diameter of 0.5 mm. and drafting by 20 times, stretched to three times and then taken up. The thus obtained filament had a tensile strength of 0.51 g./d., an elongation of 480% and an initial Young's modulus of 0.2 g./d. Further, it had an elasticity recovery of 92% as measured after maintaining it at 50% elongation for one minute and refluxing it for one minute, and the residual stress of the filament as measured after maintaining it at 50% elongation for one minute was 83%. The sticking temperature of the filament was 220° C.

EXAMPLE 2

A one liter five neck flask was equipped with a stirring apparatus, a thermometer, a dropping funnel, a thermostat to control automatically a circulation pump for cooling water by means of a switch-relay, and an air cooling tube equipped with a tube having a cock and filled with nitrogen. 880 grams of purified tetrahydrofuran and 47 g. of ethylene oxide were introduced into the flask. Nitrogen purging was conducted with the nitrogen in said tube. The flask was cooled to 0° C. using Dry Ice. Then a mixed liquid of thionyl chloride (7.4 g.) and antimony pentachloride (0.93 g.), which was prepared at room temperature, was added. Again, nitrogen purging was conducted sufficiently with the nitrogen in said tube. The flask was put in a water bath and kept at 38° C. with stirring. While maintaining the flask at the same temperature, 36 g. of thionyl chloride were added from the dropping funnel at an equal rate over 30 minutes to effect a polymerization reaction. At the end of dropping, the dropping funnel and the air cooling coil were replaced by glass tubes. The first glass tube was connected to a 100 cc. for neck flask which was stirred by means of a magnetic stirrer.

The four neck flask was cooled to —5° C. into which mixed liquid composed of tetrahydrofuran (95 weight percent) and ethylene oxide (5 weight percent) was introduced by a feed pump at a rate of 1000 g./hr. and a mixed liquid of thionyl chloride (98.3 weight percent) and antimony pentachloride (1.7 weight percent) was introduced by another feed pump at a rate of 60 g./hr. On the other hand, the second glass tube was connected to a 5 l. three neck flash in which pyridine was added and stirred (at the bottom of which there was provided an outlet equipped with a cock for removal of the product). Thus, the cyclic ether and the catalyst mixed together at −5° C. in the 100 cc. flask were transferred to the 1 l. flask (polymerization vessel) at said rates, and further transferred therefrom to the 5 l. flask where the polymerization was stopped by pyridine. The polymerization could be conducted continuously.

After the continuous polymerization was conducted for 5 hours, the pouring of cyclic ether and catalyst was stopped and at the same time 0.5 cc. of pyridine was added to the 1l. flask to terminate the polymerization. Then the glass tubes for connections and the thermostat were taken off and a reflux condenser was connected. At the top of the condenser, a volleyball tube filled with nitrogen and stopped by a cock was mounted. After purging with nitrogen, the flask was heated to 75° C. on a water bath and maintained at the same temperature for about 6 hours in the same way as in Example 1 to obtain $\alpha,\omega$-dichloro-polyalkylene oxide. The polymer yield in the steady state in the course of continuous polymerization was 70%. The obtained $\alpha,\omega$-dichloro-polyalkylene oxide contained chlorine in an amount of 2.83% and had an average molecular weight of 2510.

EXAMPLE 3

Using a similar apparatus, the polymerization operation was conducted as in Example 1 with the following differences: 95 g. of tetrahydrofuran were cooled to −5° C. and thereto was added a mixed liquid of thionyl chloride (20 g.) and antimony pentachloride (0.3 g.). Then 5 g. of 1,3 butylene oxide were added. The flask was regulated to 27° C. and maintained at 27° C. for 20 hours. Further, 0.1 cc. of pyridine and about 0.3 g. of dried active carbon were added and stirred at room temperature for 1 hour. After filtration, the filtrate was placed in a flask equipped with a reflux condenser. After nitrogen purging, the flask was sealed and heated at 100° C. for 0.5 hour. Then, about 0.3 g. of active carbon was added, and further a small amount of sodium bicarbonate was added to decompose excess thionyl chloride. Subsequently, the flask was cooled to room temperature. After filtration and drying of the filtrate, 60 g. of $\alpha,\omega$-dichloro-polyalkylene oxide were obtained. This polymer contained chlorine in an amount of 2.2% and had an average molecular weight of 3150.

EXAMPLE 4

A similar polymerization operation was conducted as in Example 1 with the following differences: 100 g. of purified tetrahydrofuran were cooled to −15° C. and thereto was added a mixed liquid of thionyl chloride (30 g.) and antimony pentachloride (0.3 g.). The temperature was elevated to 20° C., at which the flask was maintained for 24 hours. Then, about 0.3 g. of dried active carbon was added, and the mixture was stirred at room temperature for 1 hour. After filtration, the filtrate was put in a flask equipped with a reflux condenser. After nitrogen purging, the flask was heated at 75° C. for 1.5 hours and at 84° C. for 3.5 hours. Further, a small amount of slaked lime was added to decompose excess thionyl chloride, and then the flask was cooled to room temperature. By drying the filtrate after filtration, 60 g. of $\alpha,\omega$-dichloro-polyalkylene oxide were obtained. This polymer contained chlorine in an amount of 1.23% and had an average molecular weight of 5770.

EXAMPLE 5

The polymerization was conducted as in Example 1 as follows: 72 grams of purified tetrahydrofuran and 6 g. of thionyl chloride were put in the flask. While maintaining the flask at about 0° C. by cooling from the outside, 0.12 g. of stannic chloride was added. Further, 15 g. of propylene oxide was added to effect reaction while stirring.

Though the inside temperature tends to elevate gradually as the reaction proceeds, the reaction was conducted for about 5 hours while maintaining the temperature lower than 20° C. by cooling with water, ice or the like from the outside. After the reaction was completed, 0.1 g. of $\beta$-picoline was added, and further 6 g. of thionyl chloride were added. Heat treatment was conducted at about 60° C. for 25 hours while stirring as shown in Example 1. About 62 grams of product were obtanied. The obtained ploymer had an average molecular weight of 1340 and a chlorine content of 5.2%.

EXAMPLE 6

The polymerization was conducted in a similar way as in Example 1. 72 grams of purified tetrahydrofuran and 6 g. of thionyl chloride were put in the flask. While maintaining the flask at 0° C. by cooling from the outside, 0.12 g. of stannic chloride was added, additionally, 20 g. of 3-chloro-1,2-propylene oxide and 11 g. of ethylene oxide were added, and the reaction was conducted at 20° C. for about 5 hours.

After the reaction was completed, post heat-treatment was conducted in a similar way as in Example 1. About 60 g. of product were obtained. The obtained polymer had an average molecular weight of about 1150 and a chlorine content of 7.6%.

EXAMPLE 7

The polymerization was conducted in a similar way as in Example 1. The inside of the reaction vessel equipped with a stirrer and a thermometer was purged with nitrogen sufficiently, and then 72 g. of purified tetrahydrofuran and 6 g. of thionyl chloride were placed therein. The vessel was maintained at about 0° C. by cooling from the outside, and 0.12 g. of stannic chloride was added. After stirring sufficiently, 11 g. of ethylene oxide were added.

Though the inside temperature tends to elevate gradually as the reaction proceeds, the reaction was conducted maintaining the temperature at about 20° C. by cooling from the outside. Though the reaction mixture liquid became viscous after about 30 minutes, the reaction was continued for about 5 hours while stirring as it was. After the reaction was completed, 0.1 g. of pyridine was added, and then 6 g. of thionyl chloride were added. Heat treatment was conducted at 70° C. for about 5 hours. Then, sodium bicarbonate was added for neutralization, and then active carbon was added for filtration. After filtration, unreacted materials were removed under reduced pressure to obtain about 56 g. of $\alpha,\omega$-dichloro-polyalkylene oxide. The obtained polymer had an average molecular weight of about 1560 and a chlorine content of about 4.7%.

EXAMPLE 8

The polymerization was conducted in a similar way as in Example 1. The inside of the reaction vessel equipped with a stirrer and a thermometer was purged with nitrogen sufficiently, and then 72 grams of purified tetrahydrofuran and 6 g. of thionyl chloride were added. While maintaining the vessel at 5° C. by cooling from the outside, 0.15 g. of boron trifluoride-tetrahydrofuran complex was added, and then 11 g. of ethylene oxide were added. The reaction was conducted while stirring.

Though the inside temperature tends to elevate gradually as the reaction proceeds, the reaction was conducted at 20° C. for about 5 hours by cooling with water or the like from the outside. After the reaction was completed, 0.1 g. of pyridine was added and then 6 g. of thionyl chloride were added. Thereafter, heat treatment was conducted as shown in Example 1, whereby about 57 g. of product were obtained. The obtained polymer had an average molecular weight of about 1410 and a chlorine content of about 5.1%.

EXAMPLE 9

The polymerization was conducted in a similar way as in Example 1. 72 grams of purified tetrahydrofuran and 6 g. of thionyl chloride were placed in the reaction flask. While maintaining the flask at about 5° C. by cooling from the outside, 0.15 g. of boron trifluoride-phenol complex was added and then 15 g. of propylene oxide were added. The reaction was conducted while stirring.

Though the inside temperature tends to elevate gradually as the reaction proceeds, the reaction was conducted for about 5 hours maintaining the temperature at 20° C. by cooling with water or the like from the outside. After the reaction was completed, 0.1 g. of β-picoline was added and then 6 g. of thionyl chloride were added. Subsequently, heat treatment was conducted as shown in Example 1 to obtain about 49 g. of product. The obtained polymer had an average molecular weight of about 1350 and a chlorine content of 5.2%.

EXAMPLE 10

The same apparatus and operation for the preparation of α,ω-dichloro-polyalkylene oxide as in Example 1 were employed, except that a dropping funnel for introducing thionyl chloride was provided and thionyl chloride was added in the course of polymerization. In particular, 70 grams of purified tetrahydrofuran were cooled to −15° C. and thereto a mixed liquid of thionyl chloride (5 g.) and antimony-pentachloride (0.5 g.) was added. Then, 30 g. of ethylene oxide were added. The temperature was elevated to −5° C., at which the mixture was maintained for 40 hours while 40 g. of thionyl chloride were added at a rate of 1 g. at one time each 1 hour over said 40 hours to effect polymerization. Thereafter, 0.5 cc. of pyridine was added to terminate the polymerization. Subsequently, a reflux condenser was inserted between the air cooling tube and the flask. After nitrogen purging, the flask was heated to 70° C. and maintained at the same temperature for 10 hours. Then, the flask was cooled to room temperature. By drying the filtrate after filtration, 79 g. of α,ω-dichloro-polyalkylene oxide were obtained. The polymer contained chlorine in an amount of 1.38% and had an average molecular weight of 508.

We claim:

1. A process for the production of high purity α,ω-dichloro-polyalkylene oxides having an average molecular weight of 508 to 5770, said process comprising polymerizing a cyclic ether monomer system selected from the group consisting of tetrahydrofuran and mixtures of tetrahydrofuran and one other cyclic ether monomer selected from the group consisting of ethylene oxide, 1,2-propylene oxide, 1,2-butylene oxide, 1,3-butylene oxide, 2,3-butylene oxide, 2-methyl-1,3-propylene oxide, 1,2-octylene oxide, 1,2-cyclohexylene oxide, 3-chloro-1,2-propylene oxide, 2-phenyl-1,2-ethylene oxide, 3-(o-chlorophenyl)-1,2-propylene oxide, 2,2-bis-chloromethyl-1,3-propylene oxide, 2-(p-tolyl)-1,3-propylene oxide, 1,4-epoxycyclohexane, 3-methoxy-1,2-propylene oxide, 4-(3-methoxy-phenyl)-1,2-butylene oxide, 3-phenoxy-1,2-propylene oxide, 2-methyl-2-methoxymethyl-1,3-propylene oxide, 2-vinyl-1,2-ethylene oxide, 1-allyl-1,2-ethylene oxide, 1-allyl-1,2-propylene oxide, 2-ethyl-2-allyl-1,3-propylene oxide, 1-allyloxymethyl-1,2-ethylene oxide and 2-(4-allylphenyl)-1,2-ethylene oxide in the presence of 0.1 to 100 parts by weight of thionyl chloride per 100 parts by weight of cyclic ether and a Lewis acid selected from the group consisting of antimony pentachloride, stannic chloride, boron trifluoride, boron trifluoride-tetrahydrofuran complex and boron trifluoride-phenol complex at a temperature of −10° to 70° C. for about 2 to 30 hours, then adding to the obtained polymerization product an alkaline substance selected from the group consisting of pyridine, picoline and quinoline to deactivate the Lewis acid, and thereafter heat-treating the polymerization product in the presence of thionyl chloride at a temperature of 60° to 100° C.

2. The process according to claim 1, in which said Lewis acid is antimony pentachloride.

3. The process according to claim 1, in which the cyclic ether monomer system is selected from the group consisting of mixtures of tetrahydrofuran and a 3-membered cyclic ether selected from the group consisting of ethylene oxide, 1,2-propylene oxide, 1,2-butylene oxide, 2,3-butylene oxide, 1,2-octylene oxide, 1,2-cyclohexylene oxide, 3-chloro-1,2-propylene oxide, 2-phenyl-1,2-ethylene oxide, 3-(o-chlorophenyl)-1,2-propylene oxide, 3-methoxy-1,2-propylene oxide, 4-(3-methoxyphenyl)-1,2-butylene oxide, 3-phenoxy-1,2-propylene oxide, 2-vinyl-1,2-ethylene oxide, 1-allyl-1,2-ethylene oxide, 1-allyl-1,2-propylene oxide, 1-allyloxy-methyl-1,2-ethylene oxide and 2-(4-allylphenyl)-1,2-ethylene oxide and mixtures of tetrahydrofuran, said 3-membered cyclic ether and at least one other cyclic ether; and the Lewis acid is selected from the group consisting of stannic chloride, boron trifluoride, boron trifluoride-tetrahydrofuran complex and boron trifluoride-phenol complex.

4. The process according to claim 1, in which tetrahydrofuran is copolymerized with ethylene oxide.

5. The process according to claim 1, in which tetrahydrofuran is copolymerized with propylene oxide.

6. The process according to claim 1, in which tetrahydrofuran is copolymerized with 1,3-butylene oxide.

7. The process according to claim 1, in which the polymerization is effected at a temperature of 5° to 40° C.

8. The process according to claim 1, in which the Lewis acid is preliminarily mixed with thionyl chloride and then the resulting mixture is added to the cyclic ether monomer system.

9. The process according to claim 1, in which a reaction product is formed from the Lewis acid and the alkaline substance, and further comprising removing the reaction product by filtration prior to subjecting the polymerization product to the heat-treatment.

10. The process according to claim 1, in which a reaction product is formed from the Lewis acid and the alkaline substance, and further comprising removing the reaction product by adsorption with activated carbon prior to the heat-treatment of the polymerization product.

11. The process according to claim 1, in which fresh thionyl chloride is added prior to the heat-treatment of the polymerization product.

12. A process for the production of high purity, α,ω-dichloro-polyalkylene oxides having an average molecular weight of 508 to 5770, said process comprising polymerizing a cyclic ether monomer system selected from the group consisting of tetrahydrofuran and mixtures of tetrahydrofuran and one other cyclic ether selected from the group consisting of ethylene oxide, 1,2-propylene oxide, 1,2-butylene oxide, 1,3-butylene oxide, 2,3-butylene oxide, 2-methyl-1,3-propylene oxide, 1,2-octylene oxide, 1,2-cyclohexylene oxide, 3-chloro-1,2-propylene oxide, 2-phenyl-1,2-ethylene oxide, 3-(o-chlorophenyl)-1,2-propylene oxide, 2,2-bischloromethyl-1,3-propylene oxide, 2-(p-tolyl)-1,3-propylene oxide, 1,4-epoxycyclohexane, 3-methoxy-1,2-propylene oxide, 4-(3-methoxy-phenyl)-1,2-butylene oxide, 3-phenoxy-1,2-propylene oxide, 2-methyl-2-methoxy-1,3-propylene oxide, 2-vinyl-1,2-ethylene oxide, 1-allyl-1,2-ethylene oxide, 1-allyl-1,2-propylene oxide, 2-ethyl-2-allyl-1,3-propylene oxide, 1-allyloxymethyl-1,2-ethylene oxide and 2-(4-allyl-phenyl)-1,2-ethylene oxide in the presence of 0.1 to 100 parts by weight of thionyl chloride per 100 parts by weight of cyclic ether and a Lewis acid selected from the group consisting of antimony pentachloride, stannic chloride, boron trifluoride-tetrahydrofuran complex and boron trifluoride-phenol complex at a temperature of −10° to 70° C. for about 2 to 30 hours, then adding activated carbon to the polymerization product to remove said Lewis acid, and thereafter heat-treating the polymerization product in the presence of thionyl chloride at a temperature of 60° to 100° C.

13. The process according to claim 12, in which the Lewis acid is antimony pentachloride.

14. The process according to claim 13, in which the cyclic ether monomer system is selected from the group consisting of mixtures of tetrahydrofuran and a 3-membered cyclic ether selected from the group consisting of ethylene oxide, 1,2-propylene oxide, 1,2-butylene oxide, 2,3-butylene oxide, 1,2-octylene oxide, 1,2-cyclohexylene oxide, 3-chloro-1,2-propylene oxide, 2-phenyl-1,2-ethylene oxide, 3-(o-chlorophenyl)-1,2-propylene oxide, 3-methoxy-1,2-propylene oxide, 4-(3-methoxyphenyl)-1,2-butylene oxide, 3-phenoxy-1,2-propylene oxide, 2-vinyl-1,2-ethylene oxide, 1-allyl-1,2-ethylene oxide, 1-allyl-1,2-propylene oxide, 1-alloyloxymethyl-1,2-ethylene oxide, and 2-(4-allylphenyl)-1,2-ethylene oxide and the Lewis acid is selected from the group consisting of stannic chloride, boron trifluoride, boron trifluoride-tetrahydrofuran complex and boron trifluoride-phenol complex.

15. The process according to claim 12, in which tetrahydrofuran is copolymerized with ethylene oxide.

16. The process according to claim 12, in which tetrahydrofuran is copolymerized with propylene oxide.

17. The process according to claim 12, in which tetrahydrofuran is copolymerized with 1,3-butylene oxide.

18. The process according to claim 12, in which the polymerization is conducted at a temperature of from 5° to 40° C.

19. The process according to claim 12, in which Lewis acid is preliminarily mixed with thionyl chloride and the resulting mixture is added to the cyclic ether monomer system.

20. The process according to claim 12, in which fresh thionyl chloride is added prior to the heat-treatment of the polymerization product.

References Cited

UNITED STATES PATENTS

| | | | |
|---|---|---|---|
| 2,751,419 | 6/1956 | Hill et al. | 260—615B |
| 2,817,686 | 12/1957 | Cicero et al. | 260—613 |
| 2,837,574 | 6/1958 | Hill et al. | 260—615 |
| 3,358,042 | 12/1967 | Dunlop et al. | 260—615B |
| 3,359,332 | 12/1967 | Johnston | 260—615B |

OTHER REFERENCES

Morschel: "Polymerization des Tetrahydrofurans," (includes PB 22,697, PB 22,700, PB 22,698), pp. 1–4, 6, 9, 10, 12, 14, 38, 40, 48, 49 (1963).

HOWARD T. MARS, Primary Examiner

U.S. Cl. X.R.

210—611, 613; 260—2, 584